United States Patent
Ahuja et al.

(10) Patent No.: US 9,326,134 B2
(45) Date of Patent: Apr. 26, 2016

(54) DATA LOSS PREVENTION FOR MOBILE COMPUTING DEVICES

(71) Applicant: McAfee, Inc., Santa Clara, CA (US)

(72) Inventors: Ratinder Paul Singh Ahuja, Saratoga, CA (US); Balbir Singh, Gurgaon (IN); Rajbir Bhattacharjee, New Delhi (IN); Dattatraya Kulkarni, Bangalore (IN)

(73) Assignee: McAfee Inc., Santa Clara, CA (US)

( * ) Notice: Subject to any disclaimer, the term of this patent is extended or adjusted under 35 U.S.C. 154(b) by 62 days.

(21) Appl. No.: 14/126,714

(22) PCT Filed: Oct. 18, 2013

(86) PCT No.: PCT/US2013/065801
§ 371 (c)(1),
(2) Date: Dec. 16, 2013

(87) PCT Pub. No.: WO2014/063126
PCT Pub. Date: Apr. 24, 2014

(65) Prior Publication Data
US 2014/0194094 A1   Jul. 10, 2014

(30) Foreign Application Priority Data
Oct. 19, 2012   (IN) .......................... 1216/KOL/2012

(51) Int. Cl.
*H04M 1/66* (2006.01)
*H04W 12/00* (2009.01)
*G06F 21/53* (2013.01)
*H04W 4/02* (2009.01)

(52) U.S. Cl.
CPC ............... *H04W 12/00* (2013.01); *G06F 21/53* (2013.01); *H04W 4/02* (2013.01); *G06F 2221/2111* (2013.01)

(58) Field of Classification Search
CPC ..... H04L 63/20; H04L 63/10; H04L 63/0263; H04L 67/22; H04L 12/2898; H04L 63/107
See application file for complete search history.

(56) References Cited

U.S. PATENT DOCUMENTS 5,987,610 A   11/1999   Franczek et al.
6,073,142 A    6/2000   Geiger et al.
(Continued)

OTHER PUBLICATIONS

PCT International Preliminary Report on Patentability in PCT International Application Serial No. PCT/US2013/065801 mailed on Apr. 21, 2015.
(Continued)

*Primary Examiner* — Ronald Eisner
(74) *Attorney, Agent, or Firm* — Patent Capital Group

(57) ABSTRACT

System calls to a kernel of a mobile computing device are monitored. A particular system call is intercepted relating to input/output (I/O) functionality of the mobile computing device. A data loss prevention (DLP) policy is identified that is applicable to the particular system call. An action is performed on the particular system call based at least in part on the DLP policy.

23 Claims, 11 Drawing Sheets

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 8,286,253 B1 | 10/2012 | Lu et al. |
| 8,390,636 B1* | 3/2013 | Agopian ........................ 345/545 |
| 2006/0224742 A1* | 10/2006 | Shahbazi ................ H04L 63/20 709/226 |
| 2007/0156659 A1* | 7/2007 | Lim .................................. 707/3 |
| 2010/0162347 A1 | 6/2010 | Barile |
| 2011/0296308 A1* | 12/2011 | Yi .................................. 715/733 |
| 2012/0042385 A1 | 2/2012 | Risan |
| 2012/0159565 A1 | 6/2012 | Bray et al. |
| 2014/0230012 A1* | 8/2014 | Ahn .................................. 726/1 |

OTHER PUBLICATIONS

International Search Report and Written Opinion in International Application No. PCT/US2013/065801, mailed Jan. 23, 2014, 9 pages.

* cited by examiner

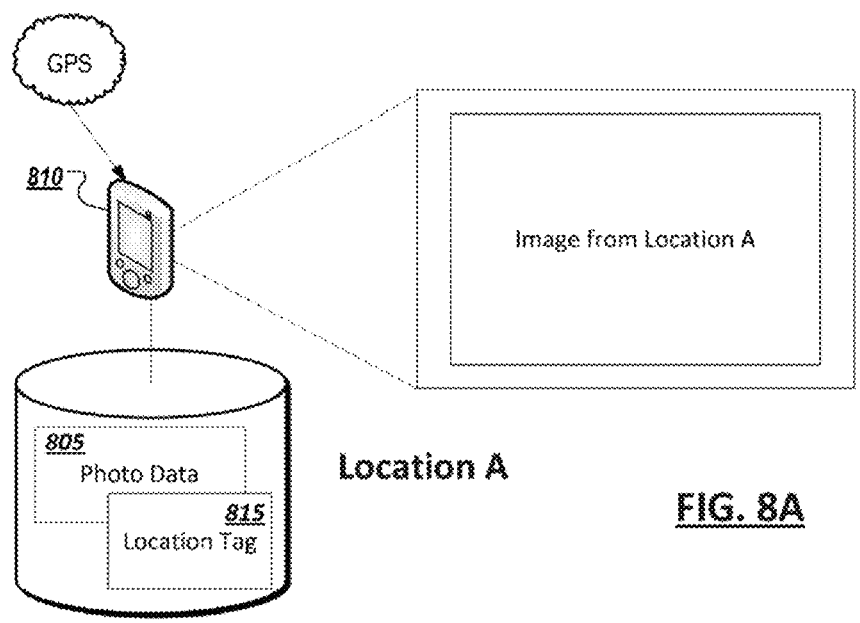
FIG. 8A
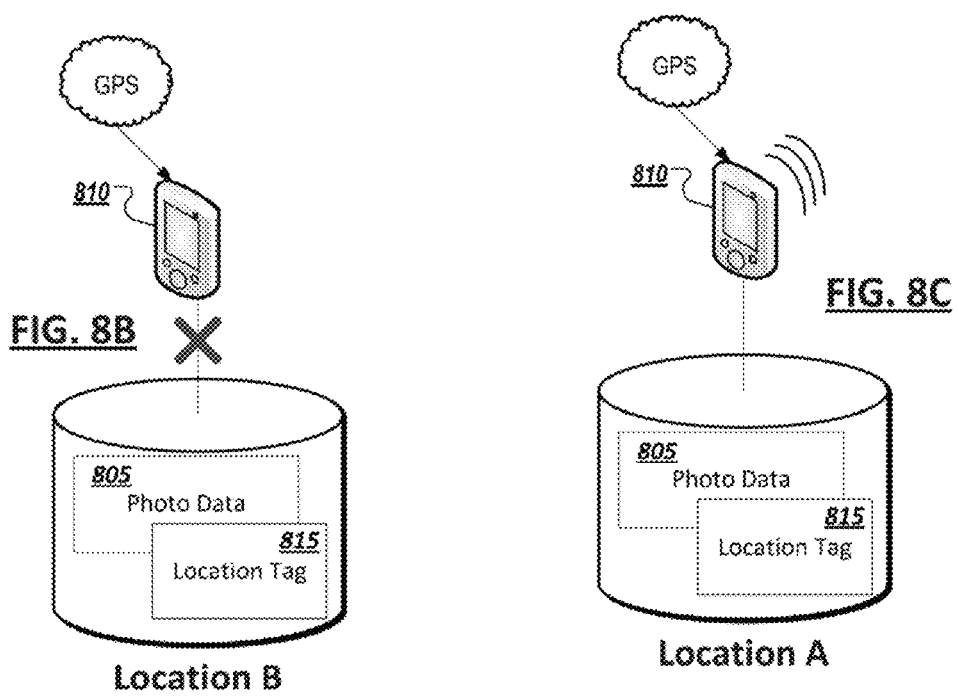
FIG. 8B
FIG. 8C

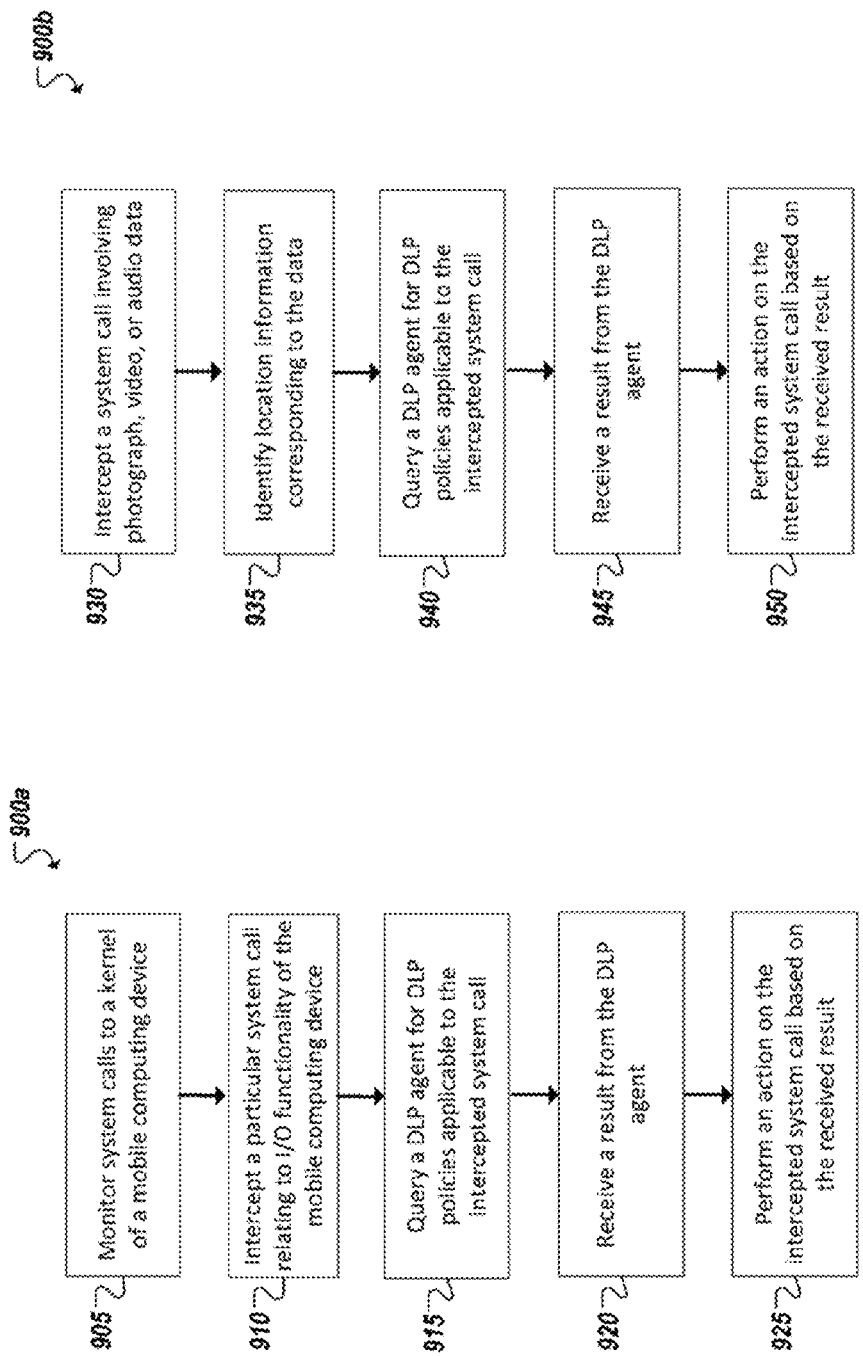

DATA LOSS PREVENTION FOR MOBILE COMPUTING DEVICES

CROSS-REFERENCE TO RELATED APPLICATIONS

This application is a national stage application under 35 U.S.C. §371 of PCT International Application Serial No. PCT/US2013/065801, filed on Oct. 18, 2013 and entitled DATA LOSS PREVENTION FOR MOBILE COMPUTING DEVICES, which application claims the benefit of priority to Indian Provisional Patent Application Serial No. 1216/KOL/2012 filed on Oct. 19, 2012 and entitled DATA LOSS PREVENTION FOR MOBILE COMPUTING DEVICES. The disclosures of the prior applications are considered part of and are hereby incorporated by reference in their entirety in the disclosure of this application.

TECHNICAL FIELD

This disclosure relates in general to the field of security and, more particularly, to managing applications in a mobile device based on location.

BACKGROUND

With the rising use of mobile devices, new challenges have emerged in the field of data loss prevention (or "DLP"). Mobile devices often have a host of information and functionalities not usually found on traditional desktops and devices, such as global positioning systems (GPS), cameras, near field communication (NFC), and so on. Such functionality can also introduce new types of sensitive data that can potentially be leaked. The situation is complicated further by the tendency for mobile devices to be constantly connected to communication networks via a variety of different channels such as voice, GPRS, 3G, 4G, SMS, data, Bluetooth™, etc. In such instances, the variety of data that can be leaked can be more diverse, as well as the opportunities for leaks to occur. Additionally, some mobile device platforms make content inspection difficult through strict containerization and coarse grained permission models, among other roadblocks. The trend of "bring your own devices" or BYOD has further concerned administrators and IT personnel tasked with providing uniform security solutions and managing control of sensitive enterprise data, among other examples.

BRIEF DESCRIPTION OF THE DRAWINGS

FIGS. 8A-8C are simplified flow diagram representing location-based DLP enforcement in accordance with some embodiments;

FIGS. 9A-9B are flowcharts representing example operations corresponding to data loss prevention for mobile computing devices in accordance with some embodiments.

Like reference numbers and designations in the various drawings indicate like elements.

DETAILED DESCRIPTION

Figure 1:
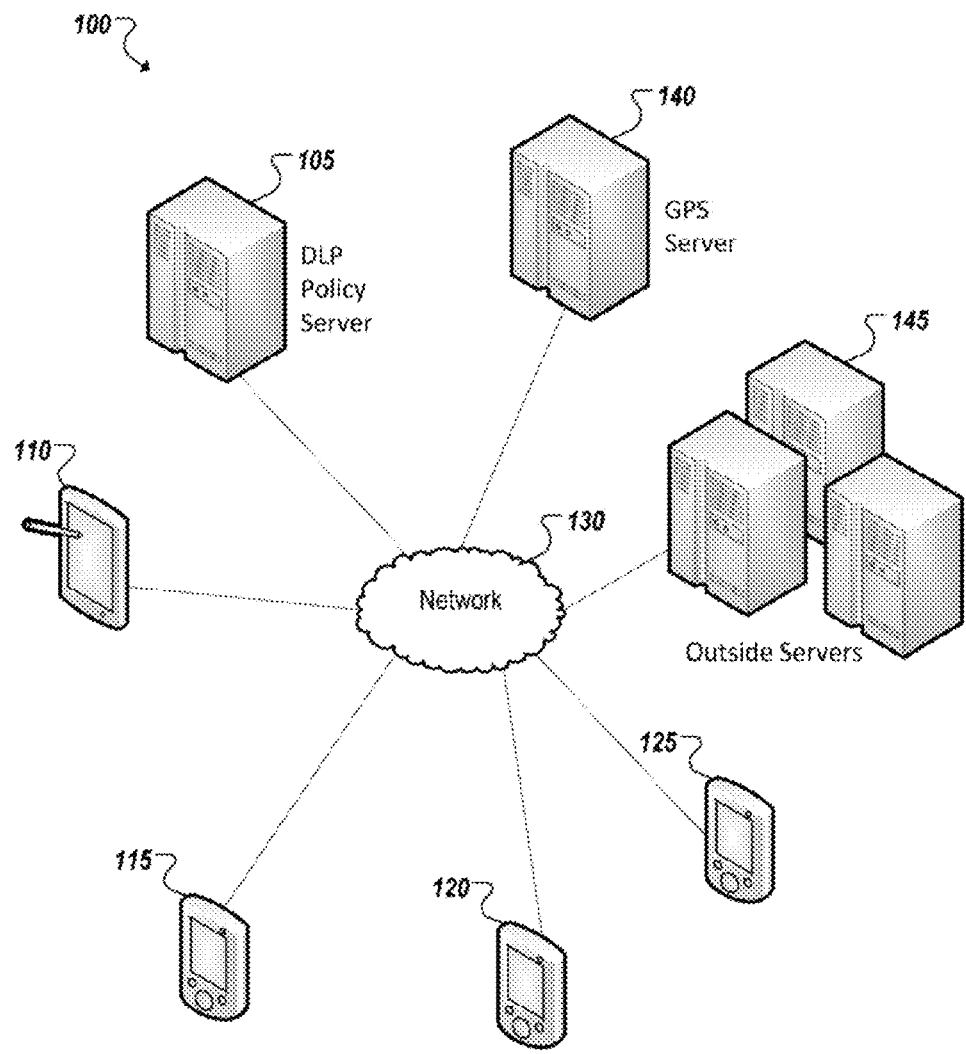
FIG. 1 is a simplified schematic diagram of an example system including a data loss prevention (DLP) policy server in accordance with one embodiment.

In some implementations, an example data loss prevention (DLP) solution can be provided for mobile user computing devices, for instance, through a kernel security manager such as a Linux™ security manager (LSM). An LSM service can work across various applications of the mobile device, provide for a flexible policy framework, and preserve configurations of mobile device applications and subsystems, among other example features.

Traditional DLP tools and systems can protect against various types of data inappropriately leaving (or entering) a system. Data types can include data-in-motion, such as email, web posts, network traffic, instant messaging, among others. Data-in-motion can be enforced, for instance, through solutions deployed at ingress and/or egress points of a system's network. Data types can further include data-at-rest data types such as shared files, databases, storage at desktop and laptop computers within a system, among other examples. Discovery and fingerprinting solutions can be utilized in connection with data-at-rest. Additionally, data-in-use types can include data stored or output via removable media, printers, graphical displays, etc. and DLP enforcement can take place at endpoint computing devices where such data egress can take place. Accordingly, traditional DLP solutions can employ a variety of solutions to protect against the various causes and forms of data loss within a system. Additionally, DLP solutions can enforce DLP policies based on analyses of the content and context of data detected as exiting or entering a system. Further, DLP solutions can make use of a variety of probes such as file system probes, email probes, network probes, HTTP probes, printer probes, to detect DLP events. Such probes and corresponding hooks can be difficult to implement however in modern mobile computing device platforms and operating systems. Mobile operating systems can constitute closed universes. Mobile devices can further possess CPU, memory, battery, and performance limitations that are unique to mobile devices. Further, mobile devices can typically possess more potential attack channels than traditional computing devices, including attack channels provided through SMS, 4G, Bluetooth™, NFC, Wi-Fi™, SD cards, among other examples. Further, additional data loss vulnerabilities can emerge as mobile device applications and users rely ever more on cloud-based and other web-provided and distributed services, among other examples.

Data can be introduced and enter mobile computing devices through a variety of mechanisms. For instance, data can be introduced through email, SMS messages, file-sharing (including cloud-based and local sharing), via the Internet, web-based applications, and so on. Data can be shared, output, or "leave" mobile computing devices through a similarly diverse array of mechanisms, such as via applications exchanging data with outside devices, webmail, web posts, messaging, email, cloud-based storage and application services, and so on. Further, as mobile computing devices are often smaller in size and carried by users into a variety of environments, mobile computing devices can be more prone to compromise, for instance, through device theft or loss, which can further serve as a basis for data loss.

FIG. 1 illustrates a simplified block diagram of a system 100 including, for example, a DLP policy server 105 and one or more mobile computing devices 110, 115, 120, 125. Mobile computing devices can connect to and communicate over one or more networks, such as the Internet, as well as private, local area, and other networks (e.g., collectively 130). Mobile computing devices (e.g., 110, 115, 120, 125) can interface with, consume services of, access and share data with a variety of other computing devices over one or more networks 130. Such computing devices can include, for instance, other personal computing devices (e.g., 110, 115, 120, 125) as well as outside servers 145 of data, applications, and services. Further, in some implementations, a DLP policy server 105, GPS server 140 and other systems can provide services in support of DLP solutions intended for mobile computing devices. Such services, in some examples, can further involve communication between mobile computing devices (e.g., 110, 115, 120, 125) and outside servers (e.g., 105, 140) over one or more networks 130. In some implementations, mobile computing devices (e.g., 110, 115, 120, 125) can include a security manager interfacing with a kernel of the mobile computing device operating in connection with a DLP agent on the mobile computing device to provide DLP services for the mobile computing device, in some cases, with support of a remote DLP policy server 105 and other outside systems, security tools, and other resources.

In general, "servers," "clients," "client devices," "computing devices," "network elements," "hosts," "system-type system entities," and "systems," including system devices in example computing environment 100 (e.g., 105, 110, 115, 120, 125, 140, 145, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux™, UNIX™, Microsoft™ Windows™, Apple™ OS, Apple™ iOS™, Google™ Android™, Windows Server™, etc., as well as virtual machines adapted to virtualize execution of a particular operating system, including customized and proprietary operating systems.

Further, servers, client devices, network elements, systems, and computing devices can each include one or more processors, computer-readable memory, and one or more interfaces, among other features and hardware. Servers can include any suitable software component or module, or computing device(s) capable of hosting and/or serving software applications and services (e.g., personal safety systems, services and applications of server 105, etc.), including distributed, enterprise, or cloud-based software applications, data, and services. For instance, in some implementations, a DLP policy server 105, GPS servers 140, outside servers 145, or other sub-systems of computing system 100 can be a cloud-implemented system configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

User, endpoint, or client computing devices (e.g., 110, 115, 120, 125, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 130). Computer-assisted, or "smart," appliances can include household and industrial devices and machines that include computer processors and are controlled, monitored, assisted, supplemented, or otherwise enhance the functionality of the devices by the computer processor, other hardware, and/or one or more software programs executed by the computer processor. Computer-assisted appliances can include a wide-variety of computer-assisted machines and products including refrigerators, washing machines, automobiles, HVAC systems, industrial machinery, ovens, security systems, and so on.

Attributes of user computing devices, computer-assisted appliances, servers, and computing devices generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some system devices can further include at least one graphical display device and user interfaces, supported by computer processors of the system devices, that allow a user to view and interact with graphical user interfaces of applications and other programs provided in system 100, including user interfaces and graphical representations of programs interacting with applications hosted within the system devices as well as graphical user interfaces associated with services and applications of system 100, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
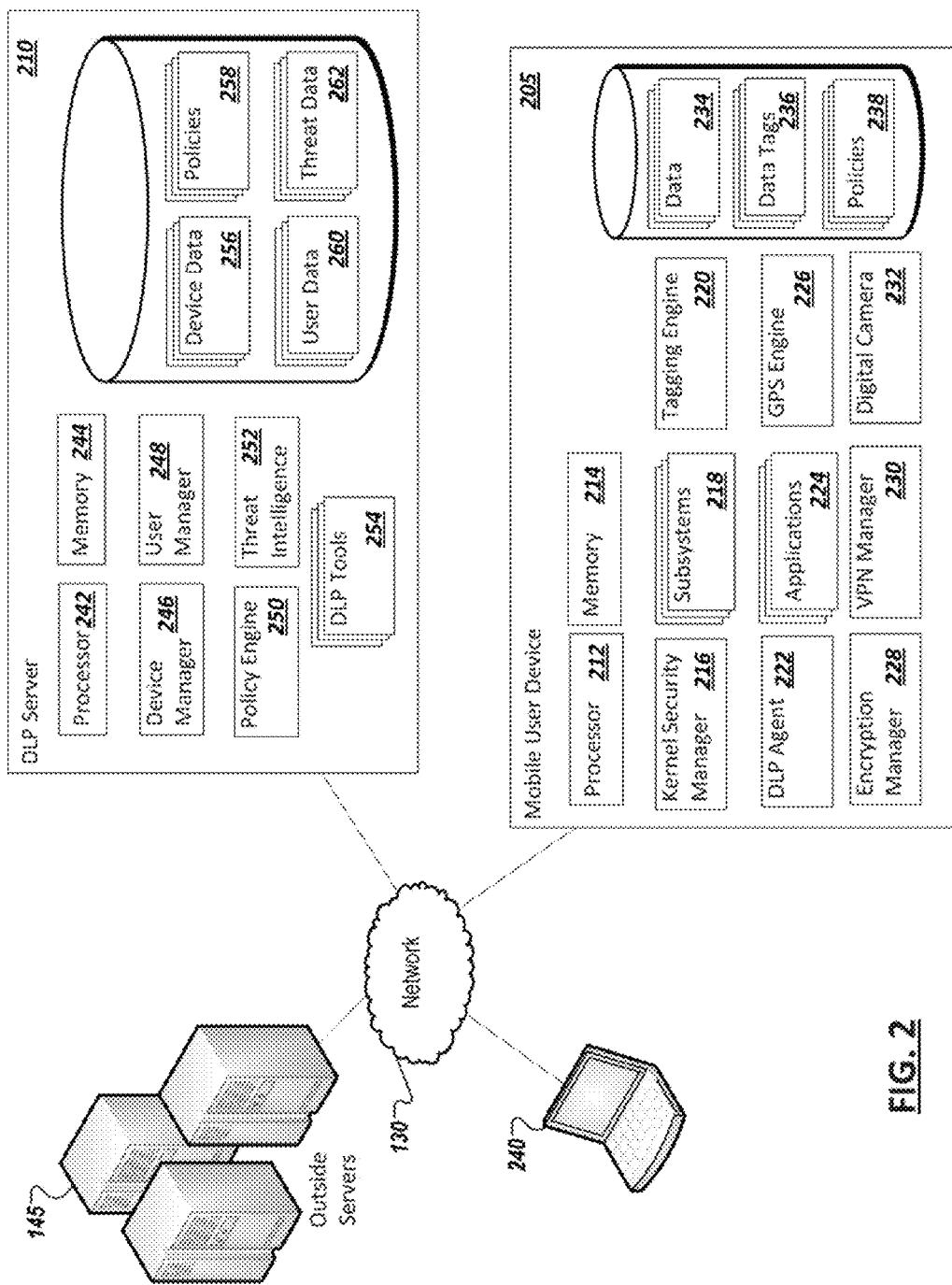
FIG. 2 is a simplified block diagram of an example system including an example mobile user device and DLP server in accordance with one embodiment.

Turning now to the example block diagram of FIG. 2, an example system is shown including an example mobile user device 205 and DLP server 210 capable of communicating and interacting over one or more networks (e.g., 130). In one example implementation, a mobile user device 205 can include one or more processor devices 212 and one or more memory elements 214, along with additional components, applications, and subsystems that can be executed or supported using processor 212 and memory elements 214. For example, a mobile user device 205 can include multiple subsystems 218, such as battery drivers, network access, display devices, data ports, speakers, telephony, among potentially many other examples. Mobile user device 205 can further include a variety of applications 224 (or "mobile apps") as well as other software and/or hardware based components and functionality. For instance, in one example implementation, mobile user device 205 can include a kernel security manager 216, such as an LSM interfacing with a Linux™ kernel, a DLP agent 222 operating in conjunction with security manager 216, and other components either separate or integrated with DLP agent 222. Such example components can include, in some examples, encryption manager 228, VPN manager 230, tagging engine 220, among other examples.

In some implementations, kernel security manager 216 and DLP agent 222 can be utilized to provide kernel-based enforcement of DLP policies 238. A variety of data 234 can be stored and maintained on mobile user device 205 and DLP policies 238 can be defined for controlling access and dissemination of certain types and content of data 234. In some implementations, DLP can be enforced through alternative approaches using, for instance, VPN manager 230 and encryption manager 228. For example, a VPN manager 230 can attempt to reroute communications involving mobile user device 205 to a virtual private network, private network, enterprise network, or other network that includes deployment of one or more DLP enforcement tools. In other instances, an encryption manager 228 can encrypt at least some of data 234 and create and manage encryption containers for securely housing portions of data 234 and protecting the data from loss, among other examples.

Further, in some implementations, data 234 can be tagged, for instance, based on the identification of one or more policies 238 applying to the respective data (e.g., 234). The presence of tags 236 on particular data files (e.g., 234) can streamline enforcement of the policies 238 on the data. Further, location data, as well as location context, can be used and considered in connection with the enforcement of DLP policies. Location data supporting such implementations can be collected and provided, for instance, through a global positioning service (GPS) available on the mobile user device 205. Indeed, some applications 224 and subsystems 218 can make use of GPS services as well as integrate geolocation detection functionality into the behaviors and operations of the applications and subsystems. For example, in some implementations, a digital camera 232 provided on mobile user device 205 can provide users with an option for geo-tagging photographs captured using the digital camera 232 among other examples. Other geolocation detection functionality can include, for example, cellular-based, network-based, or other detection functionality.

An example DLP server 210 can also include one or more processor devices 242, one or more memory elements 244, and one or more software and/or hardware based components and functionality, such as a device manager 246, user manager 248, policy engine 250, threat intelligence engine 252, and DLP tools 254 along with other security tools, components, and functionality not explicitly illustrated in the present example. For instance, a device manager 246 can manage and customize interactions of a DLP server with one or more mobile user devices (e.g., 205) in order to provide DLP services and apply DLP policies tailored to attributes of each individual device (e.g., 205) as described in device data 256. Additionally, an example user manager 248 can manage user data 260 describing various user profiles associated with various mobile user devices (e.g., 205). An example user manager 248 can utilize user data 262 to further customize and identify DLP services and policies 258 that are relevant or appropriate for a given mobile user device/user.

In some implementations, a policy engine 250 can manage policies 258 maintained by the DLP server 210. A policy engine 250 can create, supplement, modify, and manage the provision of policies 258 to client mobile user devices (e.g., 205). In some implementations, threat intelligence data 262 describing various threats and other security related conditions detected in one or more networks and systems can be considered and utilized in the generation of policies 258 as well as the assignment of policies 258 to various mobile user devices 205 based, for example, on the respective device attributes, user attributes, enterprise policies, service provider policies, and other characteristics relevant to a particular mobile user device. Further, in some implementations, an example DLP server 210 can provide DLP services through a variety of DLP tools 254 deployed remote from mobile user devices (e.g., 205) such as DLP tools implemented in a network, such as a VPN to which mobile user device traffic can be redirected, among other examples.

DLP services, whether provided locally at the respective mobile user devices (e.g., 205) or through remote systems (e.g., 210) can be used to control and monitor data entering or exiting a mobile user device and thereby also, in some instances, a network of devices in which various DLP policies 238, 258 are to apply. For example, DLP services can protect against data moving from one application to another, from mobile user device 205 to outside servers 145 or outside personal computing devices 240, between user devices, and so on. DLP services can further protect against data moving from outside sources to a given mobile user device 205, among other examples.

Figure 3:
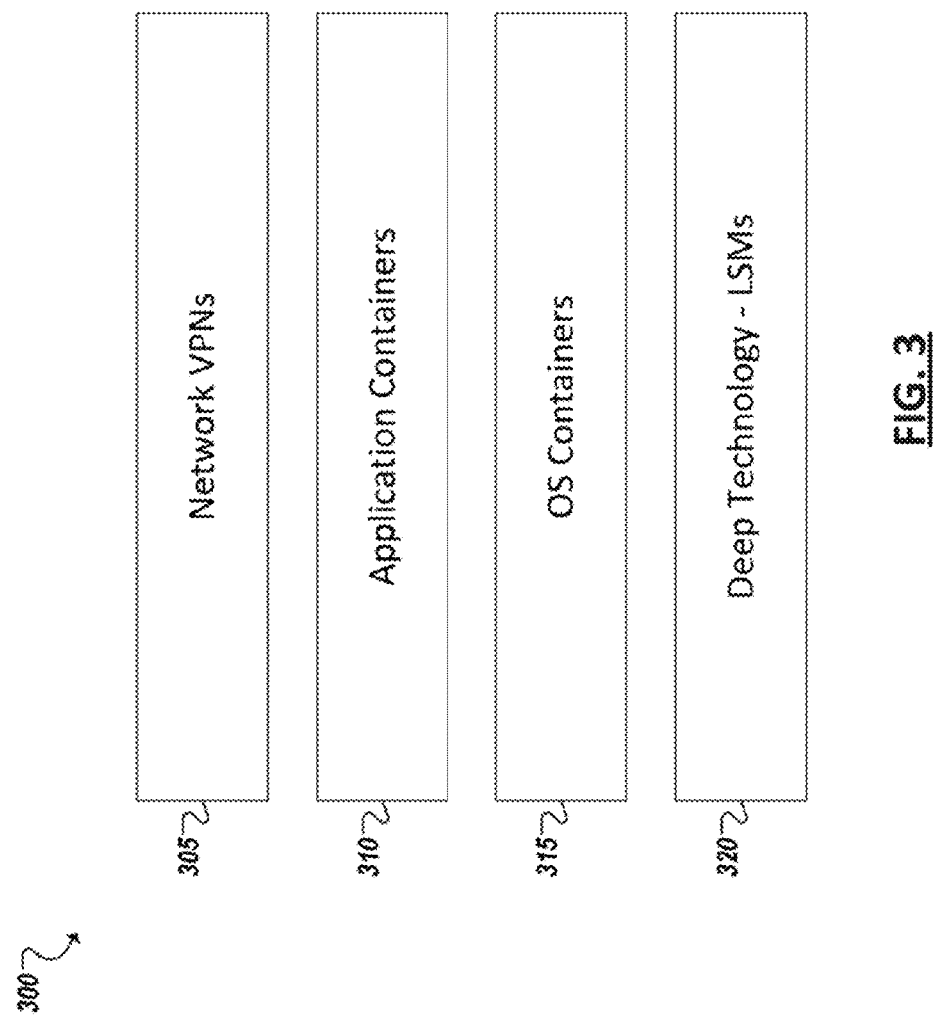
FIG. 3 is a simplified block diagram representing illustrating an example suite of DLP solutions that can be deployed in connection with one or more mobile user devices in accordance with one embodiment.

Turning to the example of FIG. 3, a simplified block diagram 300 is shown illustrating a suite of DLP solutions that can be deployed in connection with one or more mobile user devices. One or a combination of the DLP solutions in the suite can be utilized in connection with a DLP event detected on a mobile computing device. In one example implementation, DLP solutions can include the redirection of mobile device traffic to one or more private networks (such as virtual private networks (e.g., 305)) with network-based DLP tools and services that can be used for the redirected traffic to enforce one or more DLP policies, for instance. Encryption containers, such as application-specific encryption containers (e.g., 310), as well as operating system encryption containers (e.g., 315), can additionally or alternatively be utilized to protect mobile device data from loss or leakage. Additionally, deep analysis technology (e.g., 320), such as LSM-based DLP solutions can be utilized, such as through a security manager interfacing with the kernel and utilizing services of a DLP agent installed on the device.

In one example, a mobile DLP solution can provide 2-level security through in-device security (e.g., through an LSM module), out-of-device security, opportunistic routing of mobile device traffic via a VPN and network-based DLP tools and filters, including robust enterprise focused network DLP tools, among other examples.

Figure 4:
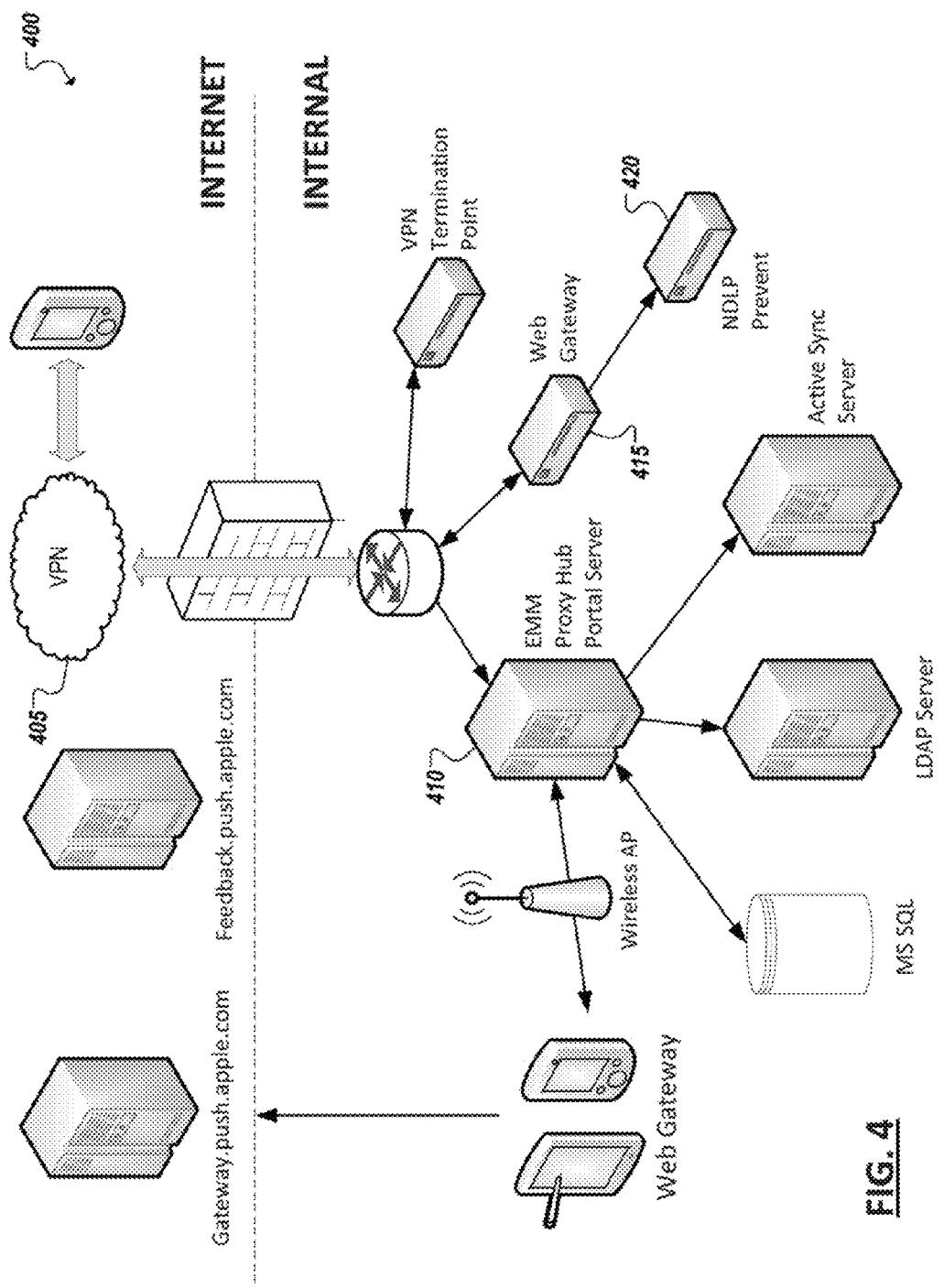
FIG. 4 is a simplified block diagram representing example network-based DLP solutions in accordance with one embodiment.

Turning to FIG. 4, a simplified block diagram 400 is shown illustrating an example implementation of network-based DLP solutions that can be utilized, in some instances, by a mobile device. Such network-based approaches can allow for the leveraging of existing network-based DLP infrastructure. For instance, by forcing mobile device traffic to a VPN 405, potentially sensitive traffic and data can be rerouted to the network where robust DLP components (e.g., 410, 415, 420) can inspect content and direct appropriate action based on the inspection. Network-based DLP solutions can include enterprise mobile management (EMM) 410 enforced VPN technology, redirecting traffic to secured web gateways 415, data loss prevention technologies (e.g., 420) implemented, for example, at the web gateways, security VPN sessions, such as one time password enforced VPNs, among other examples.

Figure 5A:
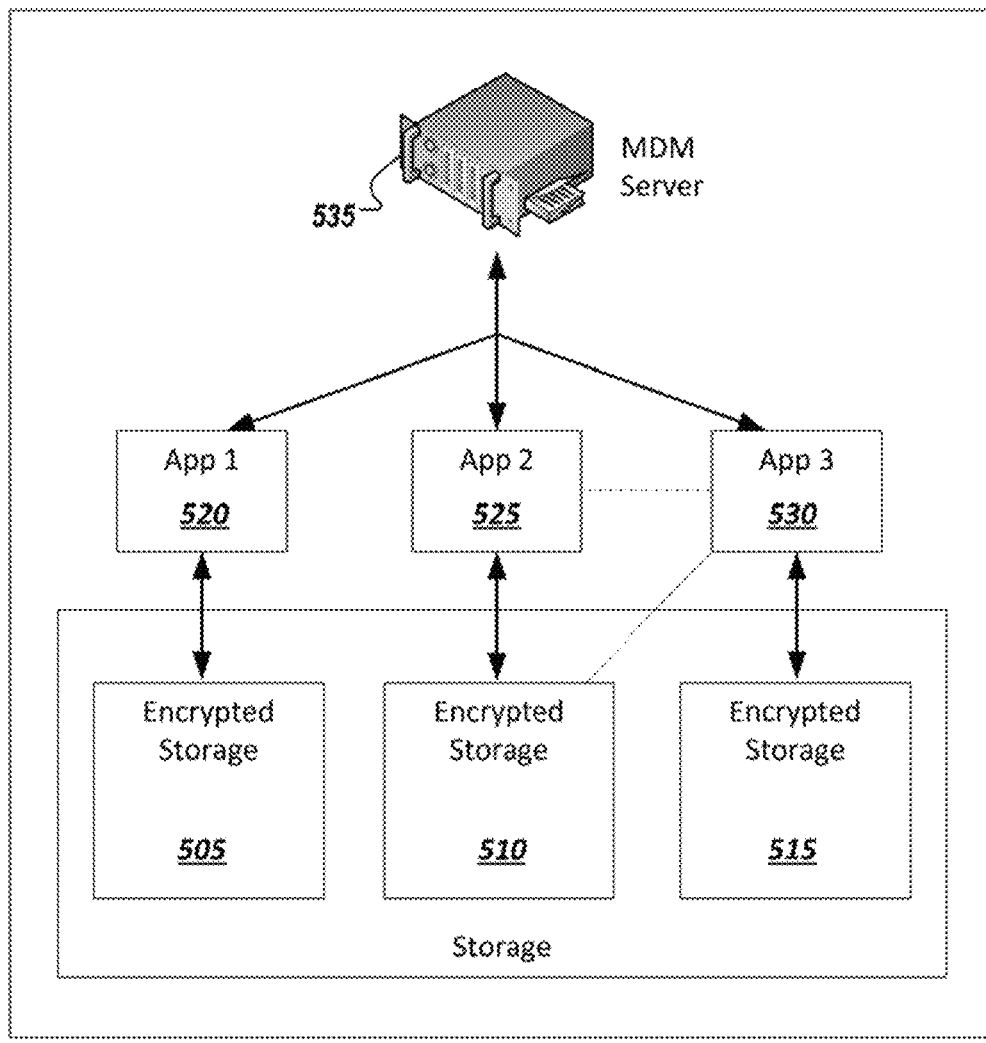
FIGS. 5A-5B are simplified representations of example encrypted containers in accordance with some embodiments.
Figure 5B:
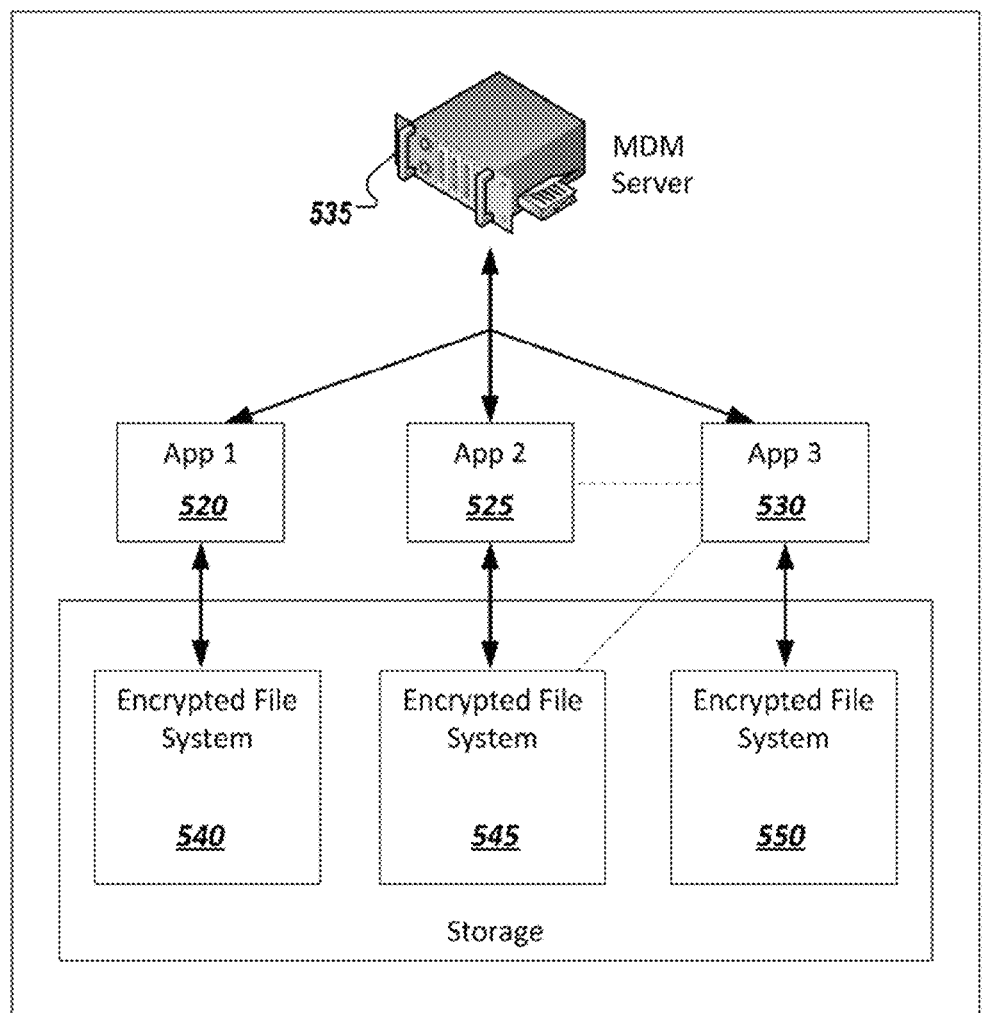

Turning to the examples illustrated in FIGS. 5A-5B, encryption containers can also be utilized in some implementations in connection with DLP for mobile computing devices. In the example of FIG. 5A, an application encrypted container solution is represented. Such containers (e.g., 505, 510, 515) can wrap the individual applications on a mobile computing device to encrypt, for a given application, all data used or generated by a particular application (e.g., 520, 525, 530). Such application containers can, in some instances, be tailored to a particular application, while in other instances an operating-system-based container implemented as a set of available encrypted file systems (e.g., 540, 545, 550) for use by applications (e.g., as illustrated in FIG. 5B) can be generically used by any variety of applications to encrypt I/O of the application. In some instances, a user can designate which applications should be wrapped in a container, for instance, based on the tendency of a given application to utilize or generate potentially sensitive data. A mobile device management system (e.g., hosted by mobile device management (MDM) server 535) can be further used to administer containers to be used for a mobile computing device. Through the use of application containers, an application can have a dedicated encrypted data store and data included in the store may be precluded from being accessed, shared, manipulated, or controlled by applications other than the application corresponding to the encrypted data store. In one example, a secure container application can interface with enterprise mobility management clients. In some implementations, third-party applications or applications not explicitly authorized for operation with a given application may be unable to communicate with a corresponding enterprise mobility management client or access encrypted storage of an application. In one example approach, application containers can be reserved for particular types of application data, such as enterprise data, with remaining types of data left unencrypted, such as user's personal files. In another example approach, the application itself can be wrapped in the container to monitor and control data being accessed by the application, among other examples.

Figure 6A:
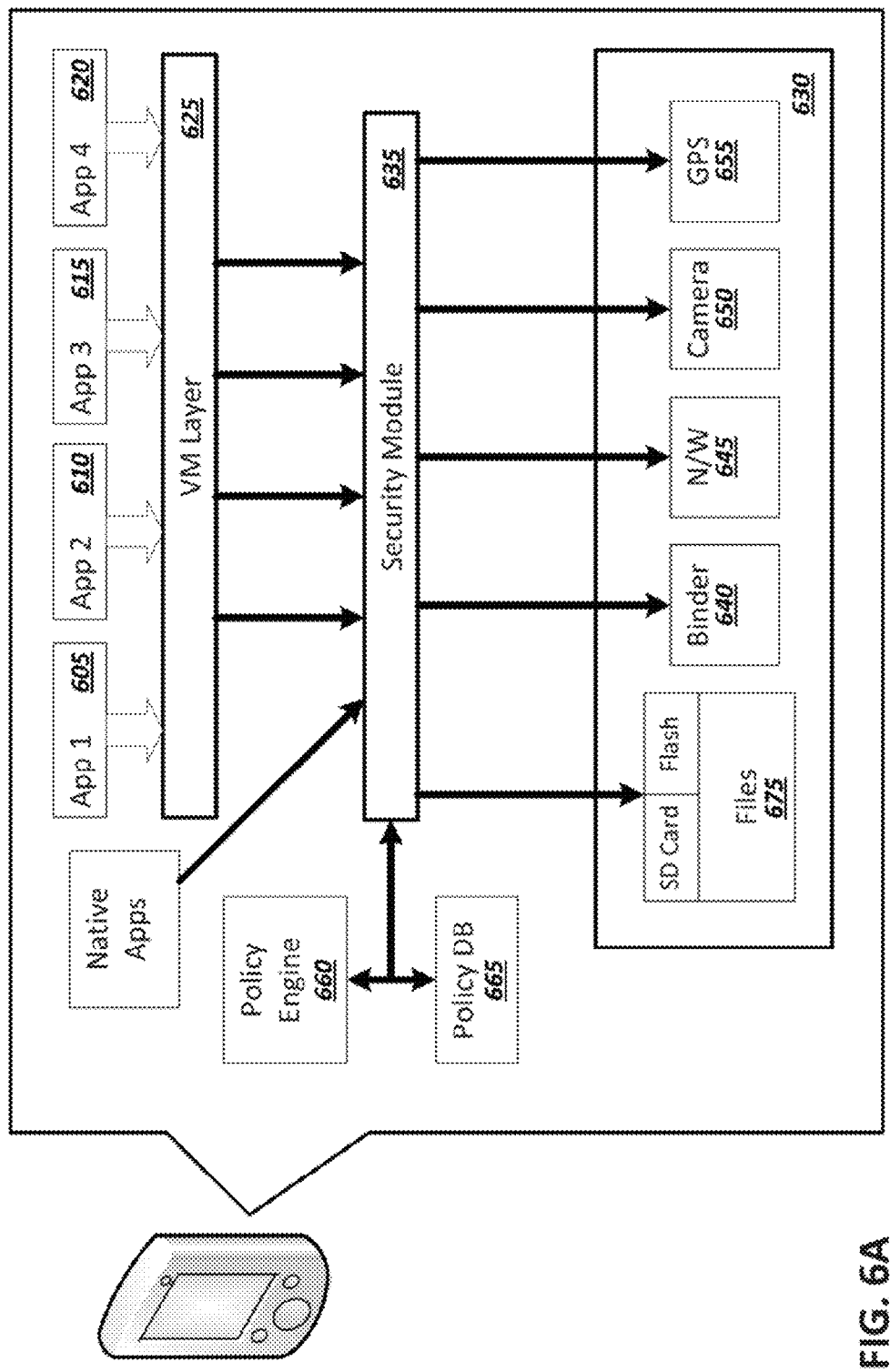
FIGS. 6A-6B are simplified block diagram representing example mobile computing devices including an example DLP agent and security module in accordance with some embodiments.
Figure 6B:
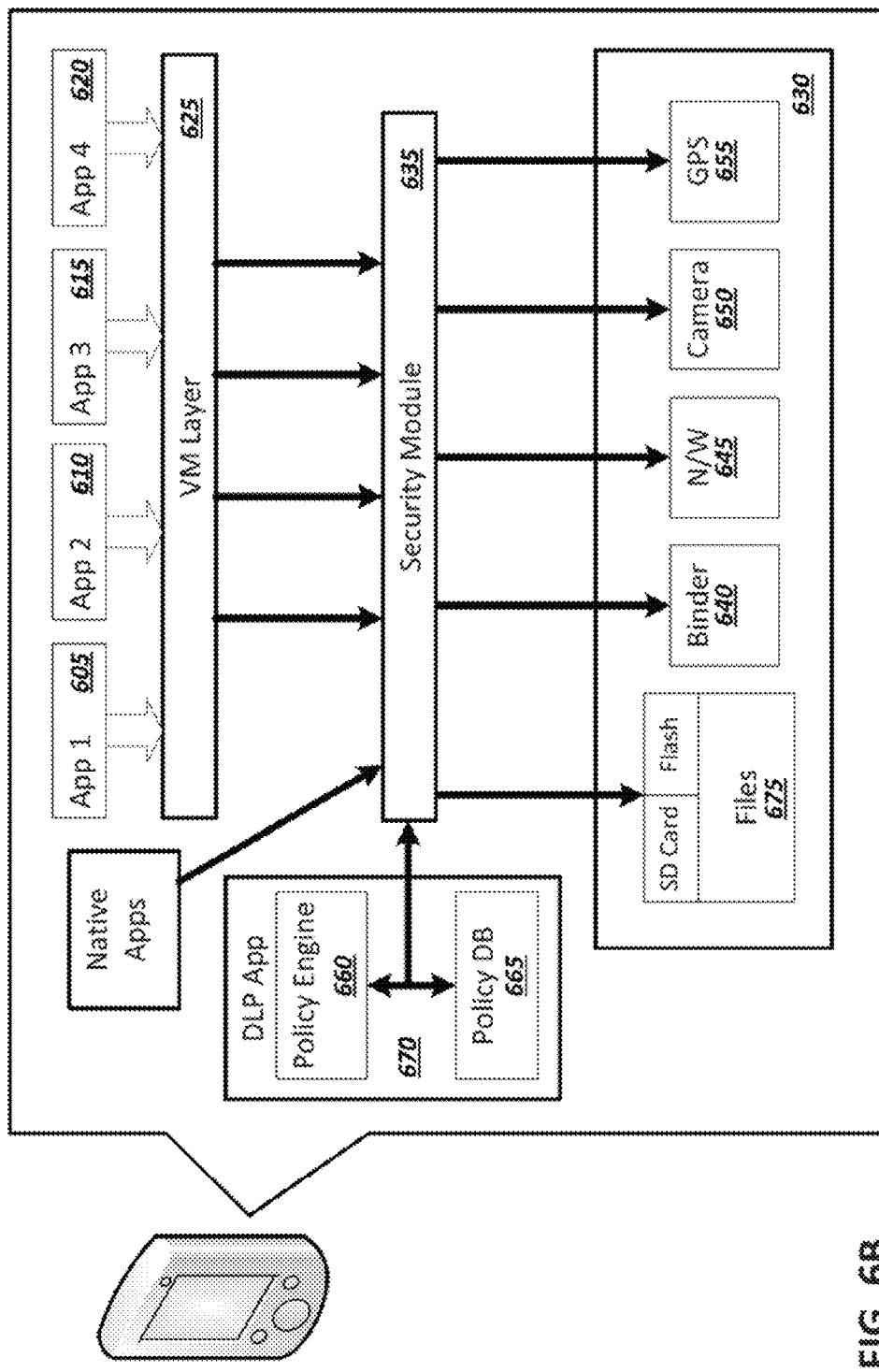

FIGS. 6A-6B illustrate example implementations of a security module based DLP solution, such as an LSM-based DLP solution for use, for example, on a smart phone or tablet employing the Google™ Android™ or another platform. It should be appreciated, that a combination of DLP solutions can be employed. In some instances, a particular one of a suite of DLP solutions can be utilized based on the type or context of the data, communication, or transaction to be managed. For instance, in one example, a failure to successfully redirect traffic to network DLP deployments on a VPN can cause one or more other DLP solutions to be invoked such as an LSM based DLP solution, among other examples. For instance, a hierarchy of DLP solutions can be defined for any one of a variety of contexts, situations, data types, transaction types, communication, devices, etc.

In an example system, a series of applications 605, 610, 615, 620 can be provided in an application layer sitting above a virtual machine layer and the Android™ framework. Applications can be containerized in that they are executed within the virtual machine layer, for instance, using a Dalvik™ virtual machine (VM) 625 (or Dalvik™ layer), among other examples. The system kernel 630 can sit below the virtual machine layer and interface with a security module 635, such as an LSM. The kernel can include a binder module 640, which has the associated device/dev/binder. In some implementations, most, if not all, communication between applications (and between applications and device subsystems (e.g., 645, 650, 655), can be facilitated via an I/O control system call to /dev/binder on the kernel 630. A security module 635 can interface with the kernel binder 640 to allow for monitoring and intercepting of I/O-related system calls. Further, a security module 635 can additionally interface with a DLP agent including functionality for inspecting intercepted system calls in determining whether one or more policies maintained, for instance, by the DLP agent, apply to the intercepted system call.

In one example implementation, shown in the example of FIG. 6A, all or a portion of the functionality of a DLP agent, such as a policy engine 660 and policy database 665, in one example, can be incorporated and coded in the security module 635 itself. In other instances, it may be desirable, to lessen the footprint in the kernel 630 by locating DLP agent logic in a DLP agent application 670 installed on the monitored mobile user device and located, in some instances, in the application layer of the platform, as illustrated in the example of FIG. 6B. In either implementation, a policy engine 660 of a DLP agent may interface and integrate with DLP policy management services hosted by other devices such as a remote DLP server, among other examples, to receive and update policies to be applied to system calls intercepted on the mobile user device.

An example security module 635 can provide hooks to allow a kernel extension to control and restrict various operations like disk-write, socket-write, I/O controls, memory map operations, and the like. A security module 635 can have access to all kernel data and leverage this access in connection with a DLP agent to implement fine-grained DLP policies on a mobile user device. For instance, a security module 635 interfacing with the kernel 630 can be utilized to restrict and monitor file operations including read, write, create, and other operations. Files 675 can be inspected and tagged, for instance, to indicate whether a file is sensitive or not and whether particular policies are applicable to the file. Further, policies can be applied and enforced based on the presence of particular tags added to files, for instance, by security module 635 (or another component). Further, data that is the subject of a particular system call or operation can be inspected and scanned, for instance, to check for patterns in the data (e.g., as defined in DLP policies) that indicate the confidential or sensitive nature of the data. Such inspections can result in the dynamic identification of such confidential and sensitive data for which particular policies are to be applied and DLP tasks performed.

Figure 7:
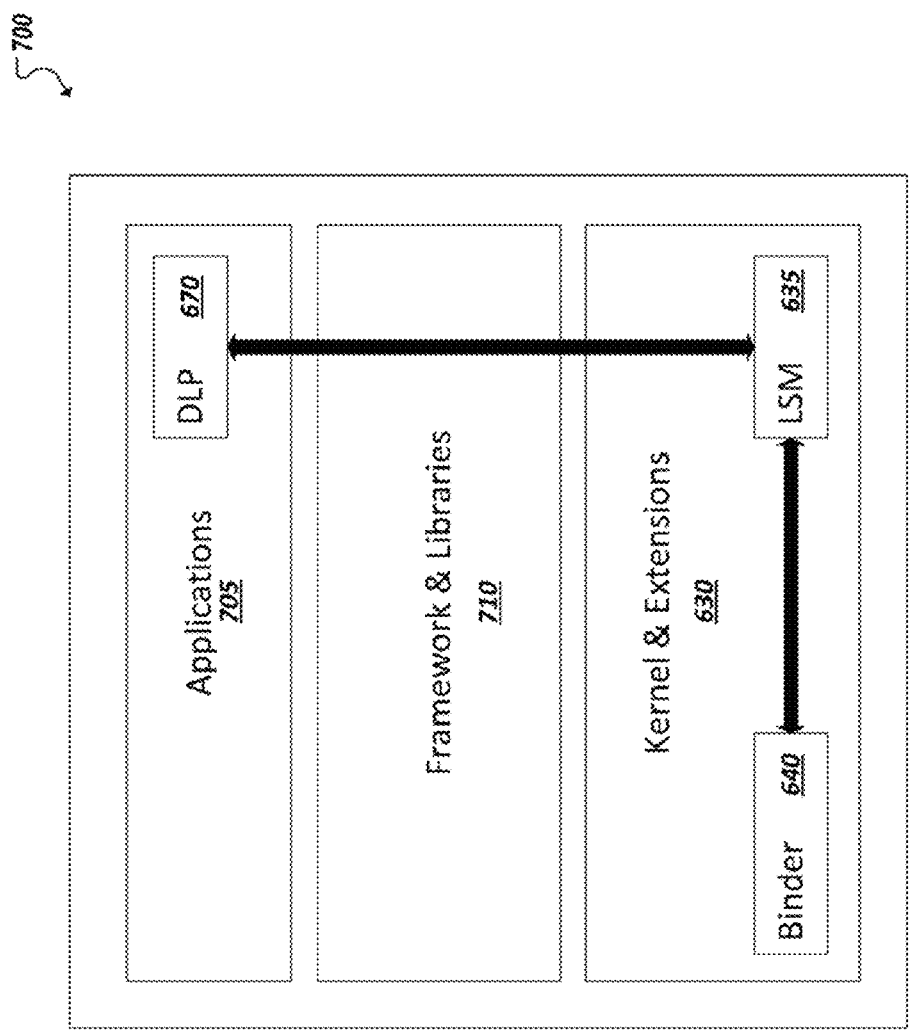
FIG. 7 is a simplified block diagram representing example interactions between a DLP agent application and a security module in accordance with some embodiments.

FIG. 7 includes a simplified block diagram 700 illustrating example interactions between a DLP agent application 670 and a security module 635, such as an LSM. In this example implementation, the LSM can be configured to interface with a kernel binder 640 to inspect I/O system calls destined for the binder 640 and potentially intercept such system calls. System calls intercepted by the LSM and data describing the characteristics of such system calls can be communicated by the LSM to a DLP agent 670. The DLP agent 670 can include logic and functionality for assessing the intercepted system calls and determining whether one or more DLP policies for the mobile user device are to be applied to the system call. If no DLP policies are identified or permissive DLP policies are identified for the intercepted system call, the DLP agent may return results to the LSM indicating that the system call involving I/O of particular data can proceed based on the DLP policies of the mobile user device. In other instances, the LSM may query the DLP agent in connection with the interception of a particular system call and the DLP agent may identify that more restrictive DLP policies apply to the particular intercepted system call. This can prompt DLP enforcement actions to be applied to the particular system call commensurate with the DLP policies identified for the particular intercepted system call. Such actions can include, in some examples, the disallowance of the system call, editing of the system call, modification or replacement of the data of the system call, among other examples.

In some implementations, an example LSM 635 can intercept certain interesting system calls like reads, writes, sends, receives, I/O controls, etc., and then pass information describing the system call and data affected or subject to the system call to a policy engine of a DLP agent 670. In some implementations, the LSM 635 can communicate with the DLP agent 670 in response to every intercepted system call in order to obtain intelligence regarding the system call's, and related data's, compliance with one or more DLP policies. The LSM can utilize intelligence (e.g., from the DLP agent or an outside source in communication with the DLP agent 670, etc.) to perform DLP actions such as restricting or modifying intercepted system calls.

Implementations, such as those illustrated and described in connection with FIGS. 6A-6B and 7 can permit robust DLP management without modification of the kernel, virtual machine layer, operating system framework, other installed applications (e.g., 705), or other libraries (e.g., 710) of the platform. Such kernel-based security modules can provide leakproof security as the security module has access to all I/O on the device. Such implementations can further provide flexibility to implement fine-grained DLP rules and enforcement actions. For instance, a security module and DLP agent can be utilized to restrict or monitor device operations (e.g., mount/unmounts, such as to disallow an attempt to mount a USB drive of the mobile device, etc.), to restrict or monitor socket operations (e.g., send, receive, bind, connect, etc.), place restrictions on applications wishing to use networking capabilities of the mobile device (e.g., through implementation of fine grained policies, scanning of data being read/ written from a socket, etc.), and restricting I/O control operations (e.g., to block clipboard and other application-to-application communication and data sharing. etc.), among other examples.

To illustrate, applications can communicate with one another via a kernel binder (and corresponding device/dev/binder), such as through a clipboard, the writing of some data to shared memory (e.g., (ashmem), and then an ioctl function call on /dev/binder). An example security module 635 can be used to detect and restrict such function calls on /dev/binder. In another example illustrating the flexibility of a security-module-based DLP solution applying principles of the above discussion, sophisticated attacks can also be blocked that take advantage of the unique characteristics and feature sets of mobile computing devices. For instance, unstructured supplementary service data (or USSD) attacks have been developed that submit URLs with tel://USSD links to mobile devices in an attempt to get the mobile device to automatically dial the USSD link and tamper with SIM credentials of the mobile device. Using a security-module-based DLP solution, the introduction of such links can be identified and intercepted at the kernel level as an I/O system call and blocked by the security module according to policies defined for avoiding such attacks. In still another example, NFC capabilities of mobile computing devices have also been exploited by malicious actors, for instance, by utilizing an NFC tag to force the browser of the mobile user device to open a malicious website, among other examples. A security-module-based DLP approach can also remedy these attacks, by identifying, intercepting, and blocking the I/O system call originating from the NFC module of the mobile user device.

In still other example implementations, a security-module-based DLP solution may be able to intercept data from system calls relating to USSD codes, NFC communications, as well as other I/O functionality on some mobile computing devices. For instance, I/O system calls, and other system calls, originating from a mobile device's Bluetooth™ module can also be intercepted and processed for DLP policy enforcement. In one example, a security-module-based DLP solution can be utilized to protect against unauthorized Bluetooth™ peripherals from connecting to the mobile computing device. For instance, policies can be defined that limit the ability of Bluetooth™ devices to connect to the mobile user computing device except under certain defined conditions, such as, when the mobile user device is detected (e.g., through GPS) as in a given trusted location (e.g., the user's home or office), for particular types of Bluetooth™ enabled devices, among other example conditions. In another example, SMS messages can be intercepted that are intended to be transmitted from the mobile device. The SMS messages can be analyzed, for instance, by the DLP agent, to identify whether the destination and/or payload of the message is in violation of one or more DLP policies. For instance, content of the message can be analyzed to identify attempts to send data identified as potentially sensitive according to one or more policies, patterns, or algorithms. As an example, SMS messages including data that appears to describe such sensitive information as credit card numbers, Social Security numbers, PIN numbers, etc. may be intercepted and blocked or modified using the security module to enforce DLP policies corresponding to the identified type of information, among many other potential examples.

As noted above, through the policy engine of a DLP agent, in cooperation with a security-module based-DLP solution at the kernel level, fine-grained DLP policies can be defined and successfully applied to I/O system calls (and other system calls) monitored using the security module at the kernel. For example, DLP protection can be implemented across each of the various I/O channels of the mobile computing device including SMS, 4G, Bluetooth™, cameras, microphones, GPS modules, etc. Further, security modules interfacing with the kernel can identify subsystems and/or applications originating or otherwise involved in a system call. Information concerning the system calls such as IP addresses and domains from which a given file originates can be identified and tracked. Such information can be used, in some examples, to provide selective DLP control by defining and enforcing policies based on the patterns identified from the tracked information, such as the trustworthiness of various sources, domains, IP addresses, applications, etc. Indeed, in some implementations, data referenced in system calls identified as originating or involving a particular known entity or domain can be tagged based on previously tracked and processed system calls involving the particular entity or domain to fast-track enforcement of associated DLP policies (e.g., specific to the particular entity or domain). Additionally, reputation scores can be generated and maintained based on information obtained through monitored system calls and the like using a security module-based DLP solution.

As noted above, a security module-based DLP solution can include functionality for tagging data intercepted in I/O system calls, among other examples. Based on an assessment of the data, for example by a DLP agent according to one of more DLP policies, the data can be tagged, for instance as confidential, untrustworthy, private, among other examples. Such tags can then be maintained by the DLP solution, for instance, by the DLP agent and/or security module. Using the tags, subsequent system calls involving the tagged data can be identified. Based on the tag, reassessment of the intercepted system call at the DLP agent can be skipped, with identification of the tag leading to an automated identification one or policies and/or DLP enforcement actions mapped to the tag (e.g., based on a previous assessment). In one example implementation, a YAFFS2 file system with extended attributes can be employed in the storage of tags. Alternatively, a database of tagged files can be maintained and referenced by a security module, such as an LSM, and/or a policy engine of the DLP agent.

In some implementations, in addition to encryption functionality provided to other potential DLP solutions, such as encryption containers, a security module can be used to intercept data included in system calls and dynamically identify, based on identified rules and policies maintained by the DLP agent, that the intercepted data is of a sensitive nature and should be encrypted. Accordingly, in some implementations, a security module can cause such intercepted data to be encrypted before proceeding, for instance, to device storage, to a device application, or to a device subsystem, for instance, to be communicated outside the mobile device. This can allow for more efficient encryption of files on a file-by-file basis and in accordance with the fine-grained DLP policies, rather than more brute force approaches, such as the encryption of an entire file system, entirety of application data, and so on. By encrypting data automatically and without explicit file-by-file designation by user, the most sensitive data on a mobile device can be maintained in an encrypted format to protect, for instance, the data being leaked or lost, such as in connection with the theft or other loss of the mobile device.

Turning to the examples of FIGS. 8A-8C, GPS and other functionality of modern mobile computing devices that allow detection of geolocation information corresponding to the mobile computing device can be leveraged in connection with DLP policies enforced through an example security module based solution. For instance location-based policies can be defined for one or more different types of data and system calls. In one example, location-based policies can be defined for a camera of a mobile computing device to protect photograph data corresponding to photographs taken using the digital camera module of the mobile computing device as well as photographs otherwise downloaded onto the mobile computing device. Similarly, such mobile device modules as a microphone corresponding to audio data, video cameras corresponding to video data, etc. can also have location-based policies defined. For instance, it may be desirable, to protect against photographs, audio data, videos, etc. that have been detected as having been captured within a particular location, such as a secure corporate, research, government, or other facility, from being shared outside of appropriate contexts germane to a user's involvement with or use of the facility. For instance, corresponding location-based policies can be defined that allow for example photograph, audio, and/or video data to only be accessible, capable of being communicated, or otherwise usable at the mobile device when the mobile device is detected as being located within the same defined location boundary or other acceptable, defined locations (e.g., as defined by one or more geo-fences). Accordingly, data received by or generated at a user computing device may be tagged with location-based information that can be identified through an example security module at a kernel in order to identify such data and recognize location-based policies applicable to the intercepted data, among other examples.

In the particular example of FIG. 8A, an illustrative representation of the capturing of photograph or video data (collectively "photograph data" 805) using, for instance, a digital camera module on a mobile computing device 810, is illustrated. Further, global positioning data can be identified in connection with the capturing of the photograph data, for instance, using GPS functionality on the mobile computing device (or other geolocation functionality). Accordingly, the photograph data 805 captured by the mobile device's 810 camera can be tagged with a location tag 815 identifying the global positioning data and describing the general (or, in some cases, specific) location where the photograph data was captured. Similar principles can also be applied to the generation of other data, such as audio data, as well as the receipt of such data from other sources. In such examples, geolocation data can be used to generate location tags indicating the spatial context of the mobile computing device's use, creation, and access of the data.

Continuing with the previous example of tagged photograph data, as shown in FIG. 8B, a user may later attempt to access or share the tagged photograph data while in a location other than one of the allowed locations corresponding to the location tag. An attempt to access or share the tagged photograph data can be intercepted using an example security module interfacing with the system kernel and one or more policies can be identified, for instance, by a cooperating DLP agent on the mobile computing device, to determine that access to the tagged data should be constrained or blocked. For example, a location-based policy may be identified that has been defined to limit the sharing of data acquired within a particular sensitive location when the mobile device is found outside the particular location (or a defined boundary corresponding to the particular location (including geopolitical boundaries)), among other examples. Accordingly, as shown in the example of FIG. 8C, a subsequent attempt to access the same tagged photographic data 805 while the mobile computing device is detected within the particular location can also be identified, with the location-based policies resulting in a user being allowed, through the mobile computing device 810, to access or otherwise use the tagged data while the mobile computing device 810 is detected (e.g., through GPS module of the mobile computing device, etc.) as within an allowed geographical area. Consequently, fine-grained location-based DLP policies can be monitored and enforced similar to other DLP policies using security-module-based DLP solutions at the kernel level of the mobile computing device, among other examples.

FIGS. 9A-9B illustrate example flow diagrams 900a-b illustrating example techniques involving a security-module-based DLP solution at the system kernel level of a mobile computing device. In the example of FIG. 9A, system calls can be monitored 905, for instance, by a security module interfacing with a kernel, such as an LSM. A particular system call can be intercepted 910 that relates to I/O functionality of the mobile computing device. A DLP agent on the mobile computing device can be queried for DLP policies applicable to the intercepted system call. In some instances, a DLP agent can be queried for each system call monitored by security module. In other examples, a security module can filter which system calls are intercepted and communicated to the DLP agent based upon logic and rules accessible to the security module, such as system calls that likely relate to I/O functionality of the mobile computing device and relate to DLP goals and/or policies for the device, among other examples. A result can be received 920 from the DLP agent and an action can be performed at 925, for instance, by the security module, based on the received result and corresponding, identified DLP policy. For instance, a result from the DLP agent can indicate a restrictive policy that applies to the intercepted system call causing the DLP agent to block, disallow, modify, or perform some other action on the system call and/or related data as is consistent with the identified policy.

Turning to example of FIG. 9B, location-based DLP policies can also be enforced on a mobile computing device. For example, a system call can be intercepted involving photograph, video, or audio data, including such data generated using cameras, microphones, and other subsystems of the mobile computing device. The type and content of data in a system call can be identified, for instance, by a security module and/or DLP agent. Further, location information can be identified 935 that corresponds to the data. For example, location information can be generated using geolocation functionality on the mobile computing device and can be used, in some instances, to tag the data with location information. Indeed, in some examples, the location tag can be identified for the data identified in the intercepted system call, among other examples and implementations. The DLP agent can be queried 940 for DLP policies applicable to the intercepted system call. Location information, in some examples, can indicate the location where particular data was created or acquired. In other examples, location information may not be directly related to the creation or acquisition of the data but may instead indicate a particular location that should be associated with the data (e.g., according to one or more policies), for instance, corresponding to a location where access or use of the data is to be conditionally allowed or, alternatively, limited. Further, the result from the DLP agent can be received 945. An action can be performed 950 on the intercepted system call based on the received result, such as an action consistent with a location based DLP policy identified for the data based on the identified location information, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. "Network elements" can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's™ .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

The following examples pertain to embodiments in accordance with this Specification. One or more embodiments may provide an apparatus, a system, a machine readable medium, and a method to monitor system calls to a kernel of a mobile computing device, intercept a particular system call relating to input/output (I/O) functionality of the mobile computing device, identify a data loss prevention (DLP) policy applicable to the particular system call, and perform an action on the particular system call based at least in part on the DLP policy.

In one example, an agent on the mobile computing device can be queried for DLP policies applicable to the particular system call and a result can be received from the agent that identifies a result from the agent identifying whether DLP policies apply to the particular system call.

In one example, the result from the agent identifies that no DLP policies or permissive DLP policies apply to the particular system call and the action includes passing the particular system call to the kernel for processing.

In one example, the result from the agent identifies one or more DLP policies applicable to the particular system call and the action includes a DLP enforcement action.

In one example, the DLP enforcement action includes disallowing the system call.

In one example, the DLP enforcement action includes modifying data to be input or output in connection with the particular system call.

In one example, the DLP enforcement action includes causing data to be input or output in connection with the particular system call to be encrypted.

In one example, the agent is an application installed on the mobile computing device.

In one example, the agent interfaces with a remote security server for policy information corresponding to the mobile computing device.

In one example, the agent logic is included in a security module interfacing with the kernel.

In one example, the kernel is a Linux™ kernel and the particular system call is intercepted by a Linux Security Module (LSM).

In one example, the particular system call includes an output of particular data utilizing at least one of SMS, near field communication (NFC), Bluetooth™, and telephony functionality of the mobile computing device.

In one example, the particular system call includes at least one of an input of particular data utilizing a camera, microphone, and global positioning system of the mobile computing device.

In one example, particular data subject to the particular system call can be tagged based on the identified DLP policy.

In one example, a subsequent system call can be received involving the particular data, the tagging can be identified, and an action can be performed on the subsequent system call based at least in part on the tagging.

In one example, applications of the mobile computing device are run in a process virtual machine container. The process virtual machine container can be a Dalvik™ process virtual machine.

In one example, systems can include a processor device, a memory element, a data loss prevention (DLP) agent, and a security manager. Systems can further include a virtual private network manager adapted to reroute input/output (I/O) attempts involving the mobile computing device to a virtual private network employing network level DLP. Systems can further include an application-level or operating system-level container for encrypted storage of data of the mobile computing device. Systems can further include a remote security server to serve policy information to the DLP agent. The system can be the mobile computing device.

One or more embodiments may provide an apparatus, a system, a machine readable medium, and a method to intercept a system call involving photograph data to a kernel of a mobile computing device. A location-based data loss prevention (DLP) policy applicable to use of the photograph data can be identified, based at least in part on a detected location of the mobile computing device. An action can be performed on the intercepted system call based at least in part on the location-based DLP policy and the location of the mobile computing device.

In one example, attempts to output the photograph data while the mobile computing device is located outside of a particular geographic location are blocked based on the location-based DLP policy.

In one example, the kernel is a Linux™ kernel and the particular system call is intercepted by a Linux Security Module (LSM).

In one example, the agent is an application installed on the mobile computing device.

In one example, the agent interfaces with a remote security server for policy information corresponding to the mobile computing device.

In one example, the agent logic is included in a security module interfacing with the kernel.

In one example, the particular system call includes at least one of an output of the photograph data utilizing SMS, email, near field communication (NFC), Bluetooth™, and WiFi™ functionality of the mobile computing device.

In one example, applications of the mobile computing device capable of utilizing the photograph data are run in a process virtual machine container. The process virtual machine container can include a Dalvik™ process virtual machine.

In one example, the photograph data includes video data.

In one example, identifying the location-based DLP policy includes querying an agent on the mobile computing device for DLP policies applicable to the photograph data and receiving a result from the agent identifying whether DLP policies apply to the photograph data, the result identifying the location-based DLP policy.

In one example, the location-based DLP policy restricts access to the photograph data outside of a particular geographic area. The particular geographic area can be defined using a geofence. The particular geographic area can correspond to a location where the photograph data was created.

In one example, the system call involves an input of the photograph data and the photograph data originates from a camera on the mobile computing device.

In one example, the action includes tagging the photograph data with location information, the location-based DLP policies enforced on the photograph data based on the tagged location information.

In one example, the location information corresponds to a location where the photograph data was captured.

In one example, the location information corresponds to geopositional data captured using the mobile computing device at the capturing of the photograph data.

In one example, a subsequent system call can be received involving the photograph data, the location data can be identified, and the location data can be communicated in connection with a query of the agent for DLP policies applicable to the photograph data. An action can be performed on the subsequent system call based at least in part on the tagging.

In one example, systems can include a processor device, a memory element, and a security manager. Systems can further include a digital camera to generate the photograph data. The system can be the mobile computing device.

In one example, systems can further include a DLP agent and identifying the location-based DLP policy can include querying a DLP agent on the mobile computing device for DLP policies applicable to the photograph data and receiving a result from the agent identifying whether DLP policies apply to the photograph data, the result identifying the location-based DLP policy.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine accessible storage medium having instructions stored thereon, the instructions when executed on a machine, cause the machine to:
   intercept a system call to a kernel of a mobile computing device, wherein the system call involves photograph data;
   query a data loss prevention (DLP) agent on the mobile computing device to identify a particular DLP policy applicable to use of the photograph data, wherein the particular DLP policy conditionally restricts use of the photograph data based at least in part on location of the mobile computing device;
   identify a current detected location of the mobile computing device; and
   perform, based on the particular DLP policy and the current detected location, an action on the intercepted system call.

2. The storage medium of claim 1, wherein attempts to output the photograph data while the mobile computing device is located outside of a particular geographic location are to be blocked based on the particular DLP policy.

3. The storage medium of claim 1, wherein the DLP agent is an application installed on the mobile computing device.

4. The storage medium of claim 3, wherein the DLP agent interfaces with a remote security server for policy information corresponding to the mobile computing device.

5. The storage medium of claim 1, wherein the DLP agent is included in a security module interfacing with the kernel.

6. The storage medium of claim 1, wherein the particular system call includes at least one of an output of the photograph data utilizing SMS, email, and wireless communication functionality of the mobile computing device.

7. The storage medium of claim 1, wherein applications of the mobile computing device capable of utilizing the photograph data are run in a process virtual machine container.

8. The storage medium of claim 1, wherein the photograph data includes video data.

9. A method for providing computer security, the method comprising:
   intercepting a system call to a kernel of a mobile computing device, wherein the system call involves photograph data;
   querying a data loss prevention (DLP) agent on the mobile computing device to identify a particular DLP policy applicable to use of the photograph data, wherein the particular DLP policy conditionally restricts use of the photograph data based at least in part on location of the mobile computing device;
   identifying a current detected location of the mobile computing device; and
   performing, based on the particular DLP policy and the current detected location, an action on the intercepted system call.

10. The method of claim 9, wherein identifying the particular DLP policy includes
    receiving a result from the DLP agent identifying whether DLP policies apply to the photograph data, the result identifying the particular DLP policy.

11. The method of claim 9, wherein the particular DLP policy restricts access to the photograph data outside of a particular geographic area.

12. The method of claim 11, wherein the particular geographic area is defined using a geofence.

13. The method of claim 11, wherein the particular geographic area corresponds to a location where the photograph data was created.

14. The method of claim 9, wherein the system call involves an input of the photograph data and the photograph data originates from a camera on the mobile computing device.

15. The method of claim 14, wherein the action includes tagging the photograph data with location information, wherein location-based DLP policies are enforced on the photograph data based on the tagged location information.

16. The method of claim 15, wherein the location information corresponds to a location where the photograph data was captured.

17. The method of claim 16, wherein the location information corresponds to geopositional data captured using the mobile computing device at the capturing of the photograph data.

18. The method of claim 15, further comprising:
    receiving a subsequent system call involving the photograph data;

identifying the location information;
communicating the location information in connection with a query of the DLP agent for DLP policies applicable to the photograph data; and
performing an action on the subsequent system call based at least in part on the tagging.

19. A system for providing computer security, the system comprising:
a processor device;
a memory element; and
a security manager interfacing with a kernel and adapted, when executed by the processor device to:
intercept a system call involving photograph data to a kernel of a mobile computing device, wherein the system call involves photograph data;
query a data loss prevention (DLP) agent on the mobile computing device to identify a particular DLP policy applicable to use of the photograph data, wherein the particular DLP policy conditionally restricts use of the photograph data based at least in part on location of the mobile computing device;
identify a current detected location of the mobile computing device; and
perform, based on the particular DLP policy and the current detected location, an action on the intercepted system call.

20. The system of claim 19, further comprising a digital camera to generate the photograph data.

21. The system of claim 19, wherein identifying the location-based DLP policy includes
receiving a result from the DLP agent identifying whether DLP policies apply to the photograph data, the result identifying the particular DLP policy.

22. The system of claim 21, further comprising the DLP agent.

23. The system of claim 19, wherein the system comprises the mobile computing device.

* * * * *